United States Patent
Blackburn et al.

(10) Patent No.: US 7,061,130 B1
(45) Date of Patent: Jun. 13, 2006

(54) METHOD OF DETERMINING TRANSITION FROM STARTER TO ALTERNATOR FUNCTION BY MONITORING STARTER/ALTERNATOR MOTOR PHASE VOLTAGE OR CURRENT

(75) Inventors: Scott Evart Blackburn, Temperance, MI (US); Eric Keith Manning, Toledo, OH (US)

(73) Assignee: Dana Corporation, Toledo, OH (US)

( * ) Notice: Subject to any disclaimer, the term of this patent is extended or adjusted under 35 U.S.C. 154(b) by 69 days.

(21) Appl. No.: 10/769,879

(22) Filed: Feb. 3, 2004

(51) Int. Cl.
*F02N 11/04* (2006.01)
*H02J 7/14* (2006.01)
*H02J 7/24* (2006.01)

(52) U.S. Cl. .................... 290/31; 322/99; 180/65.2; 180/65.4

(58) Field of Classification Search ............... 290/31; 322/99; 180/65.2, 65.4
See application file for complete search history.

(56) References Cited

U.S. PATENT DOCUMENTS

| | | | |
|---|---|---|---|
| 2,307,364 A | 1/1943 | Elkin | 290/31 |
| 3,530,369 A * | 9/1970 | Thompson | 323/258 |
| 3,681,658 A | 8/1972 | Naoi et al. | 361/33 |
| 3,857,043 A | 12/1974 | Habasch | 290/38 R |
| 4,056,765 A * | 11/1977 | Scheidler et al. | 322/99 |
| 4,121,146 A * | 10/1978 | Hill | 322/99 |
| 4,163,186 A * | 7/1979 | Haley | 340/636.15 |
| 4,247,813 A * | 1/1981 | Gansert et al. | 322/99 |
| 4,622,930 A | 11/1986 | Hamano et al. | 477/99 |
| 4,860,145 A * | 8/1989 | Klingbiel | 361/18 |
| 4,947,051 A | 8/1990 | Yamamoto et al. | 290/38 R |
| 5,168,208 A * | 12/1992 | Schultz et al. | 322/25 |
| 5,801,516 A * | 9/1998 | Rice et al. | 322/37 |
| 5,983,850 A | 11/1999 | Vilou | 123/179.3 |
| 6,153,942 A | 11/2000 | Roseman et al. | 290/47 |
| 6,438,487 B1 * | 8/2002 | Mingo et al. | 701/113 |
| 6,456,042 B1 * | 9/2002 | Kwok | 320/134 |
| 6,466,026 B1 * | 10/2002 | Champlin | 324/430 |
| 6,612,386 B1 * | 9/2003 | Tamai et al. | 180/65.4 |
| 6,765,398 B1 * | 7/2004 | Hu | 324/754 |
| 6,897,574 B1 * | 5/2005 | Vaysse | 290/31 |
| 6,936,996 B1 * | 8/2005 | Uematsu et al. | 322/99 |

* cited by examiner

*Primary Examiner*—Darren Schuberg
*Assistant Examiner*—Pedro J. Cuevas
(74) *Attorney, Agent, or Firm*—Berenato, White & Stavish LLC

(57) ABSTRACT

The present invention is directed to determining and controlling the appropriate moment at which a combined starter/alternator should transition from start-up mode to alternator/generator mode following an IC engine start-up sequence. The method relies on starter/alternator motor phase voltage or motor phase current monitoring to establish the timing of the transition.

5 Claims, 6 Drawing Sheets

METHOD OF DETERMINING TRANSITION FROM STARTER TO ALTERNATOR FUNCTION BY MONITORING STARTER/ALTERNATOR MOTOR PHASE VOLTAGE OR CURRENT

FIELD OF THE INVENTION

The invention relates to the field of automotive electrical systems. Specifically, the invention is directed to a method of determining the moment following a start-up sequence for an IC engine as to when a starter/alternator should transition from start-up to generator function.

BACKGROUND OF THE INVENTION

The trend in automotive electrical systems has always been towards more power and higher voltages. At this time, an element of the trend involves the combination of the alternator and starter into a single IC engine driven unit. This combined starter/alternator can be driven either directly on the crankshaft of the IC engine as a part of the flywheel, on one end, or the balancer, on the other. Alternatively, the starter/alternator can be mounted for gear, belt, or chain drive from the crankshaft along with other IC engine driven components (i.e., waterpump/A/C compressor/power steering pump, etc.)

The starter/alternator has become more powerful not only for increasing power (current and voltage) but also for more rapid and more frequent starting cycles of the IC engine as enhanced operating efficiencies are sought. In pursuit of these goals, the starter/alternator has become more sophisticated in its control systems and its responsiveness to system requirements for both starter functions and generating functions.

In older systems where the alternator and starter function were performed by separate devices, the need to determine the optimal moment to transition from a starter function to an alternator function did not exist. Rather, the vehicle operator, relying on vehicle familiarity and overall driving experience, actuated the starter until engine startup was perceived. To limit the possibility of damaging the starter from overspeed, a special one-way disengaging drive was sometimes employed.

The alternator or generator was connected into older systems by virtue of a regulator that either accepted charge into the system to meet an electrical load, or for battery charging, or kept the alternator out of the system altogether as necessary. The alternator or generator in older systems did not change function from a starter to an alternator or generator.

In more modern vehicles with combined starter/alternator devices, a need exists to transition the device from starter to alternator/generator function at an appropriate moment following IC engine start-up. If the transition occurs too quickly, the IC engine may not, in-fact, have started. If it occurs too slowly, damage to the starter/alternator device may occur either directly or to the driving/driven mechanical connection between the IC engine and the device. In either case, premature wear and/or replacement is the likely outcome.

SUMMARY OF THE INVENTION

The present invention is directed to determining and controlling the appropriate moment at which a combined starter/alternator should transition from start-up mode to alternator/generator mode following an IC engine start-up sequence. The method relies on starter/alternator motor phase voltage or motor phase current monitoring to establish the timing of the transition.

In the voltage monitoring embodiment, an initial voltage across the motor phase is established $V_o$. The voltage then drops to a first level $V_1$ as the start-up sequence proceeds. Once the IC engine operation becomes self sustaining and develops torque, the voltage will increase and to a third level $V_2$, where $V_1 < V_2 < V_0$. The starter/alternator controller will detect the level change and then make the transition from starting mode to generation mode.

In the current monitoring embodiment, an initial current in the starter/alternator motor phases is established $I_o$. The current then increases to a first level $I_1$ as the start-up sequence proceeds. Once the IC engine operation becomes self sustaining and develops torque, the current in the motor phases will decrease and to a third level $I_2$, where $I_0 < I_2 < I_1$. The starter/alternator controller will detect the level change and then make the transition from starting mode to generation mode.

DETAILED DESCRIPTION

Figure 1:
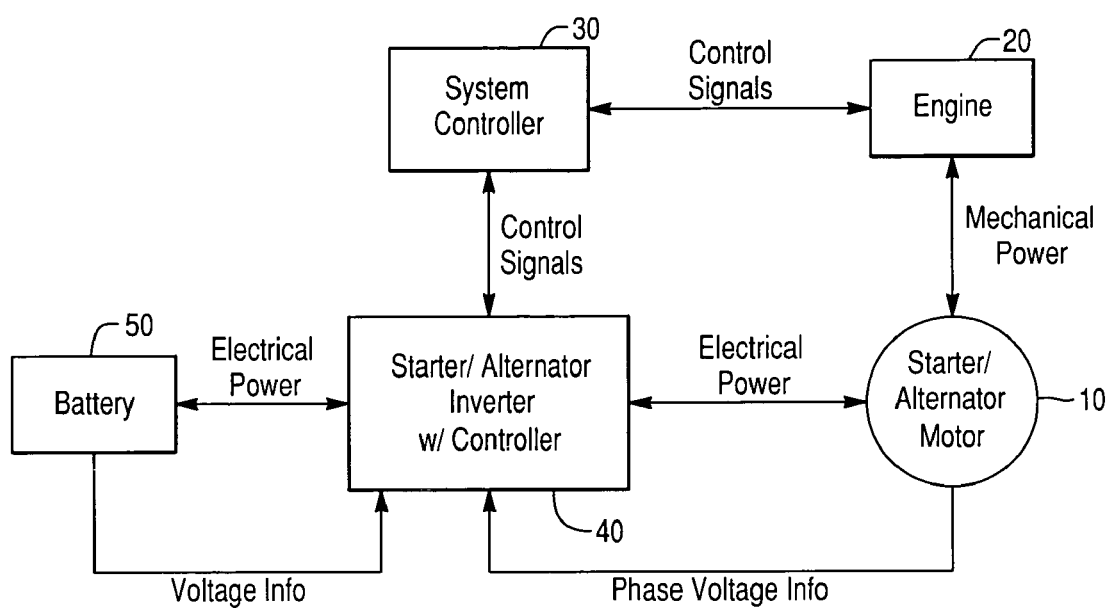
FIG. 1 shows a block diagram of the necessary sensors and hardware to accomplish the present method for the motor phase voltage monitoring embodiment.
Figure 2:
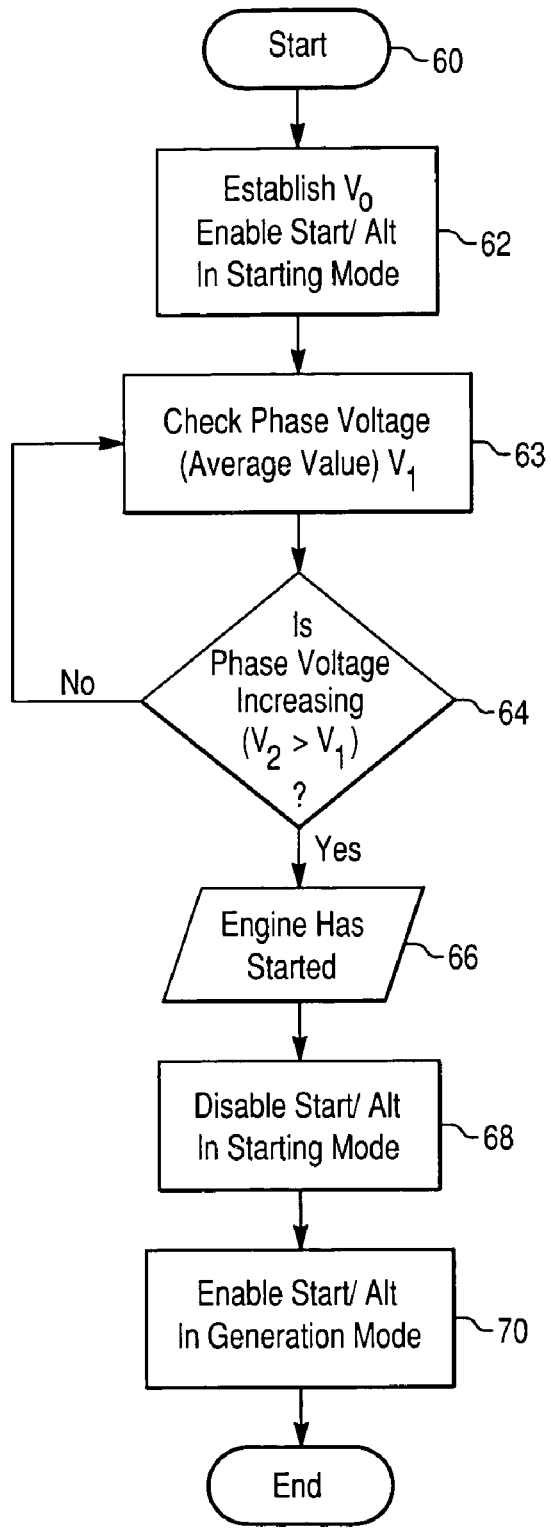
FIG. 2 shows a flow chart of decision making for the method used by the system controller in the present invention to determine the moment to transition from starter to alternator/generator function where motor phase voltage is being monitored.
Figure 3:
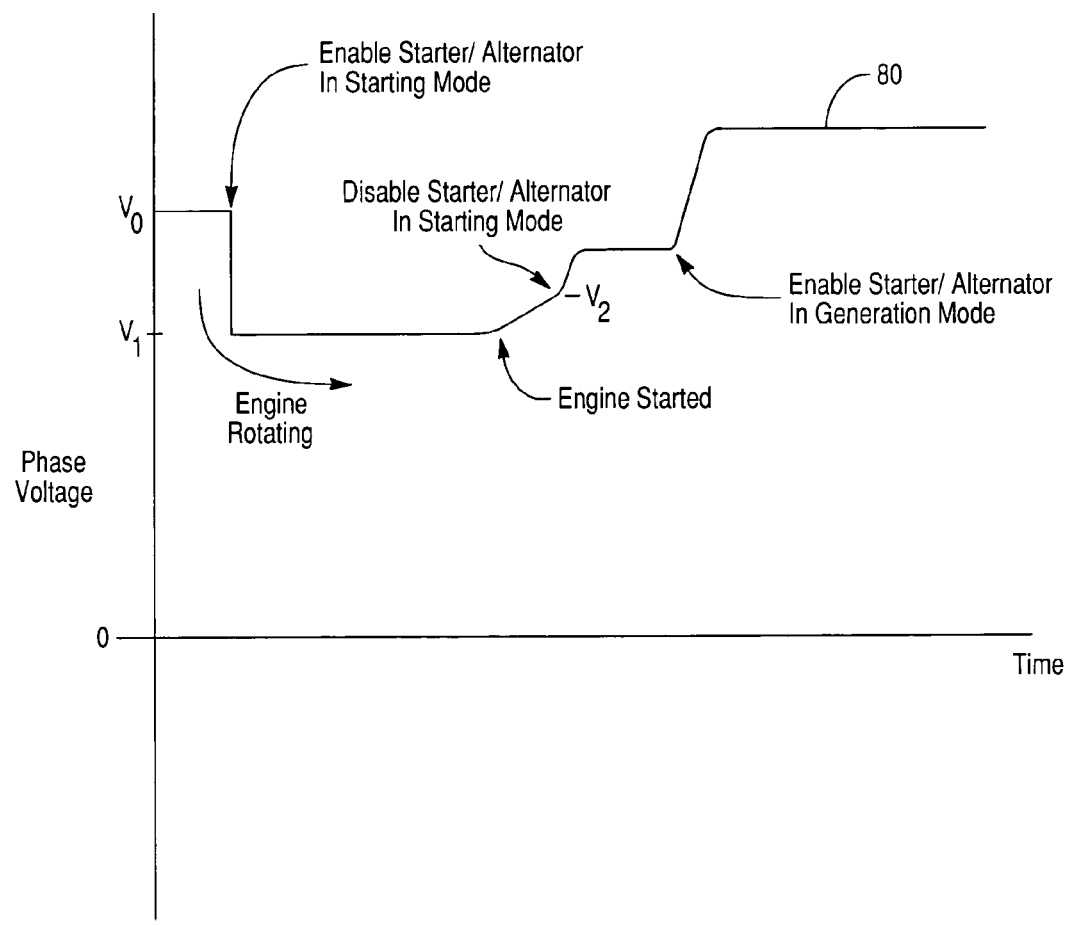
FIG. 3 is a graphical depiction of the waveform for the voltage change as the start-up sequence for the IC engine is initiated until such time as alternator/generator function is achieved.
Figure 4:
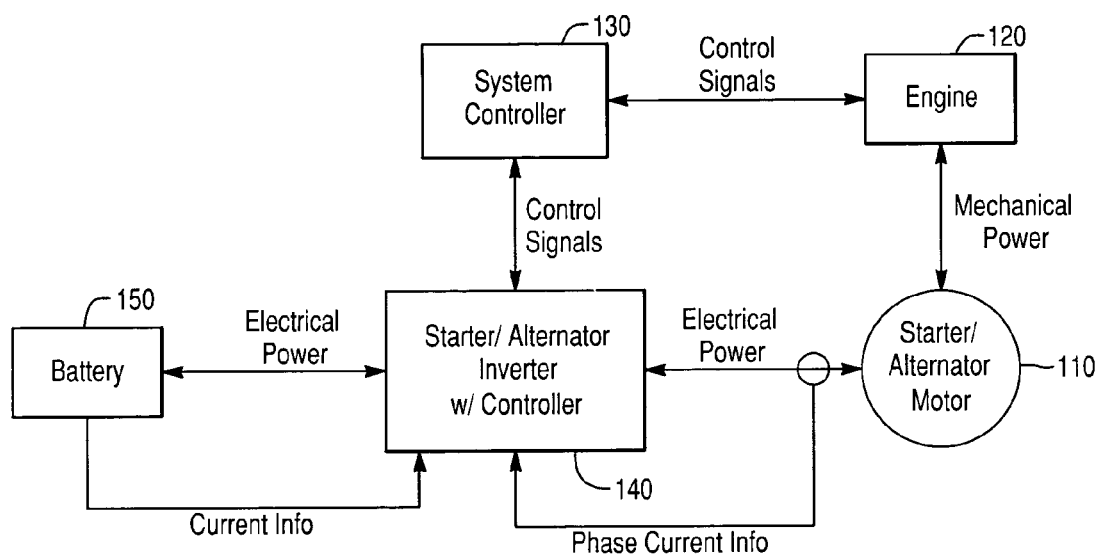
FIG. 4 shows a block diagram of the necessary sensors and hardware to accomplish the present method for the motor phase current monitoring embodiment.
Figure 5:
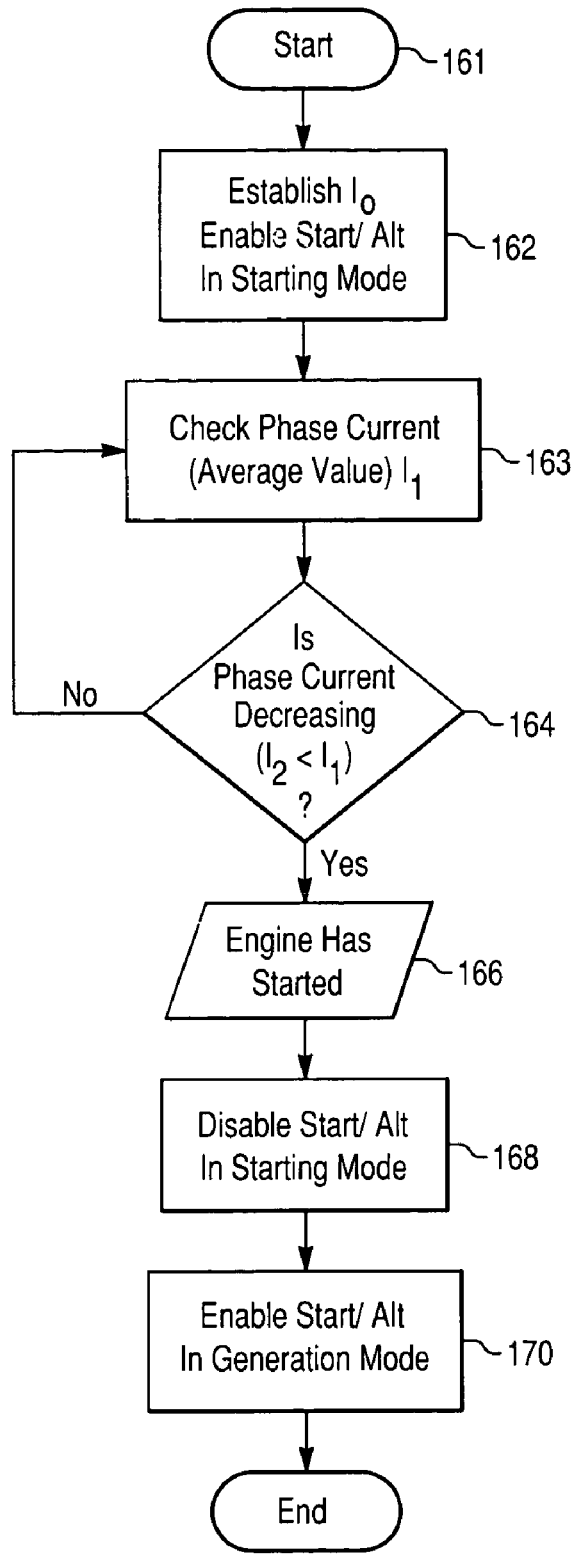
FIG. 5 shows a flow chart of decision making for the method used by the system controller in the present invention to determine the moment to transition from starter to alternator/generator function where motor phase current is being monitored.
Figure 6:
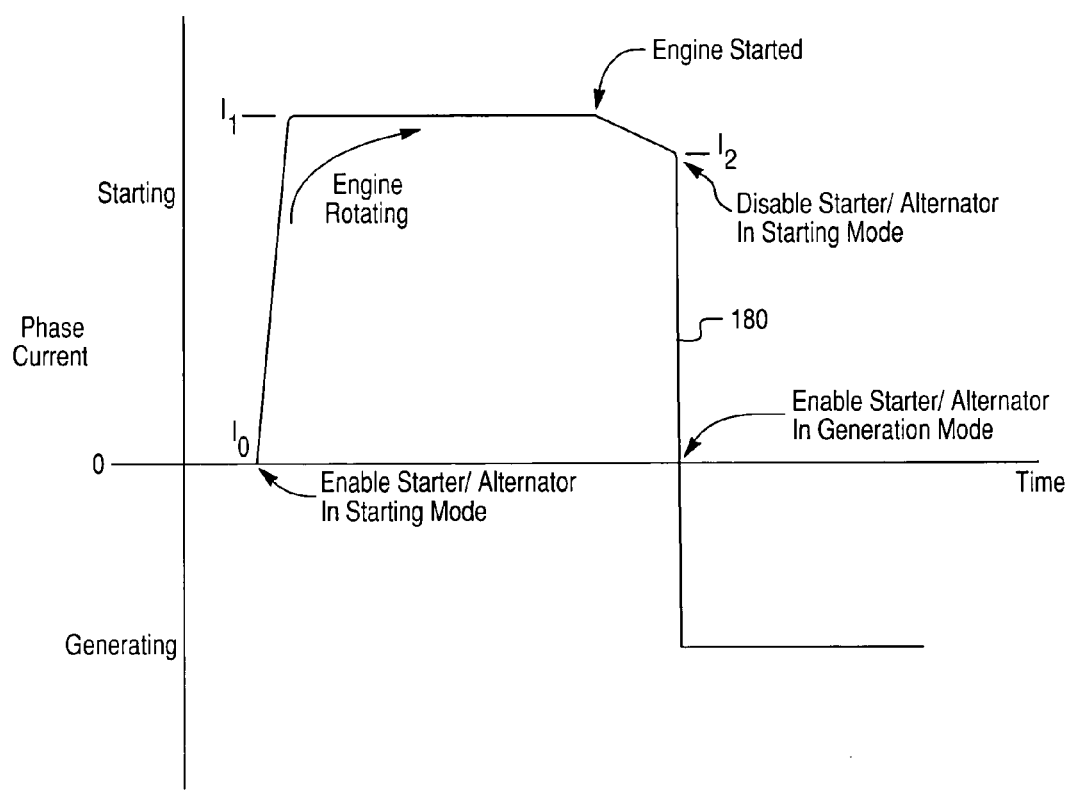
FIG. 6 is a graphical depiction of the waveform for the current change as the start-up sequence for the IC engine is initiated until such time as alternator/generator function is achieved.

The present invention is directed to a method of controlling a starter/alternator device and determining an appropriate moment to transition from starter function to alternator/generator function following a start-up sequence. The invention includes two embodiments. FIGS. 1–3 are directed to the embodiment where motor phase voltage is monitored and forms the basis of the determining function. FIGS. 4–6 are directed to the embodiment where motor phase current is monitored and forms the basis of the determining function.

As shown in FIG. 1, the present method is intended to function in a system including an IC engine 20 driven starter/alternator 10. This device 10 can be directly driven by association with a crankshaft of the IC engine, another engine driven shaft, i.e., the camshaft, or by an engine driven accessory. The system further includes a system controller 30 that supplies control signals to the IC engine as well as to and from the starter/alternator controller 40. A battery 50 is also associated with the system and receives charging and loading as necessary by the controller 40. In addition motor phase voltage and/or motor phase current information is also provided to the controller 40. This motor phase voltage and/or current information can be obtained by monitoring any one or all of the respective motor phases in the starter/alternator 10.

In FIG. 2, in the motor phase voltage monitoring embodiment, an initial voltage $V_O$ is established at the moment the IC engine start-up sequence is about to initiate 62. The monitored voltage then drops to a first level $V_1$ as the start-up sequence proceeds 63. Once the IC engine operation becomes self sustaining and develops torque, the voltage across the motor phases will increase and to a third level $V_2$ 64, where $V_1<V_2<V_0$. The starter/alternator controller will detect the level change, presume the IC engine is running and, thereafter, make the starter/alternator 10 transition from starting mode to generation mode.

In FIG. 3 the graph shows the voltage level established at an initial reference level $V_0$. This is advantageously detected prior to each start-up sequence inasmuch as battery voltage can vary within a certain acceptable range depending on state-of-charge, electrolyte quality and quantity, environmental conditions, etc. Likewise, voltage in the motor phases can vary within limits depending on ambient temperature, recent start cycles, etc. Hence $V_0$ is initially detected and used as a reference voltage. Thereafter, once the start-up sequence, i.e., IC engine cranking, is occurring, the sensed voltage drops to $V_1$ followed by an increase to $V_2$ as the IC engine 20 becomes self-sustaining, i.e., torque generating, and no longer relies on the starter/alternator 10 for motive power. Once $V_1<V_2<V_0$ the starter/alternator 10 is provided a signal from controller 40 to transition to alternator/generator mode.

As shown in FIG. 4, the second embodiment of the present method is intended to function in a system including an IC engine 120 driven starter/alternator 110. This device 110 can be directly driven by association with a crankshaft of the IC engine, another engine driven shaft, i.e., the camshaft, or by an engine driven accessory. The system further includes a system controller 130 that supplies control signals to the IC engine as well as to and from the starter/alternator controller 140. A battery 150 is also associated with the system and receives charging and loading as necessary by the controller 140. In addition, battery and motor phase current information is also provided to the controller 140.

In the motor phase current monitoring embodiment shown in FIGS. 4–5, an initial current $I_o$ is established. The motor phase current then increases to a first level $I_1$ as the start-up sequence proceeds and the starter/alternator 110 cranks the IC engine 120 and draws increasing current from battery 150 into the motor phases. Once the IC engine 120 operation becomes self sustaining and develops torque, the current in the motor phases being drawn from the battery 150 will decrease and to a third level $I_2$, and when $I_0<I_2<I_1$ as the starter/alternator 110 is no longer drawing current so as to provide motive power to rotate the IC engine 120. The starter/alternator controller 140 will detect the level change and then signal the starter/alternator 110 to make the transition from starting mode to generation mode.

In FIG. 6 the graph shows the motor phase current level 180 established at an initial reference level $I_0$. This is advantageously detected prior to each start-up sequence inasmuch as motor phase current can vary within a certain acceptable range depending on state-of-charge of the battery, electrolyte quality and quantity, environmental conditions, wiring harness condition and temperature etc. Hence $I_0$ is initially detected and used as a reference current. Thereafter, once the start-up sequence, i.e., IC engine cranking, is occurring, the sensed current rises to $I_1$ followed by a decrease to $I_2$ as the IC engine 120 becomes self-sustaining, i.e., torque generating, and no longer relies on the starter/alternator 110 for motive power. Once $I_0<I_2<I_1$ the starter/alternator 110 is provided a signal from controller 140 to transition to alternator/generator mode.

We claim:

1. A method of controlling a starter/alternator in a start-up sequence of an IC engine driven generating system including a battery and a starter/alternator controller, comprising the steps of:
   detecting a first value of a starter/alternator motor phase electrical characteristic;
   initiating a start-up sequence of said IC engine by signaling said starter/alternator to operate in starter mode;
   detecting a second and third value of said starter/alternator electrical characteristic as said start-up sequence is proceeding;
   comparing said first, second, and third detected electrical characteristic values; and,
   signaling said starter/alternator to transition to alternator/generator mode when said second detected value is between said first and third detected values.

2. A method as in claim 1, wherein:
   said motor phase electrical characteristic is voltage, and said first detected value is the highest of said first, second and third detected values.

3. A method as in claim 1, wherein:
   said motor phase electrical characteristic is current, and said first detected value is the lowest of said first, second and third detected values.

4. A method of controlling a starter/alternator in a start-up sequence of an IC engine driven generating system including a battery and a starter/alternator controller, comprising the steps of:
   detecting a first value of starter/alternator motor phase voltage $V_0$;
   initiating a start-up sequence of said IC engine by signaling said starter/alternator to operate in starter mode;
   detecting a second and third value of said motor phase voltage $V_1$ and $V_2$ respectively as said start-up sequence is proceeding;
   comparing said first, second, and third detected motor phase voltages; and,
   signaling said starter/alternator to transition to alternator/generator mode when $V_1<V_2<V_0$.

5. A method of controlling a starter/alternator in a start-up sequence of an IC engine driven generating system including a battery and a starter/alternator controller, comprising the steps of:
   detecting a first value of starter/alternator motor phase current $I_0$;
   initiating a start-up sequence of said IC engine by signaling said starter/alternator to operate in starter mode;
   detecting a second and third value of said motor phase current $I_1$ and $I_2$ respectively as said start-up sequence is proceeding;
   comparing said first, second, and third detected motor phase currents; and,
   signaling said starter/alternator to transition to alternator/generator mode when $I_0<I_2<I_1$.

* * * * *